J. J. HOLLAND.
VALVULAR COUPLING.
APPLICATION FILED MAY 7, 1919.
1,373,505.
Patented Apr. 5, 1921.
2 SHEETS—SHEET 1.
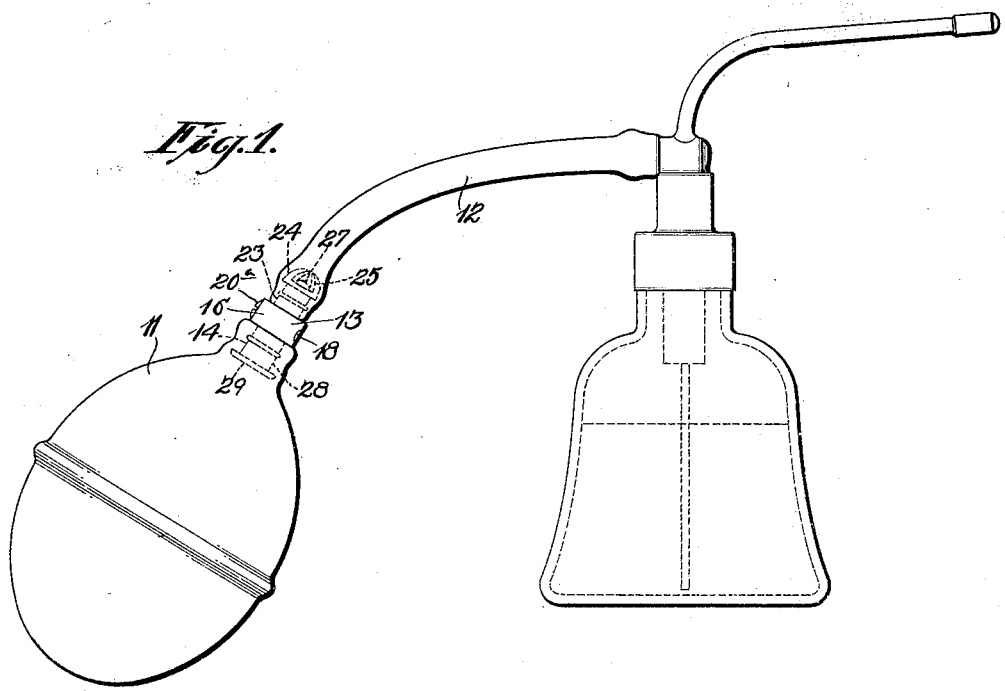
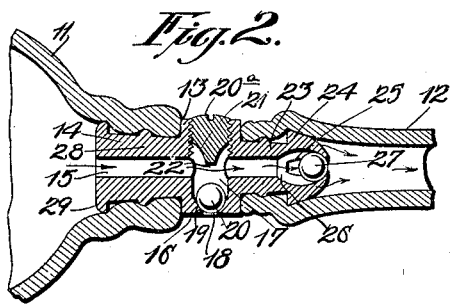
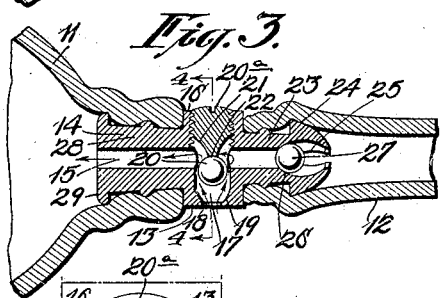
Witnesses
Inventor
James J. Holland.
By Joshua R. H. Potts
His Attorney

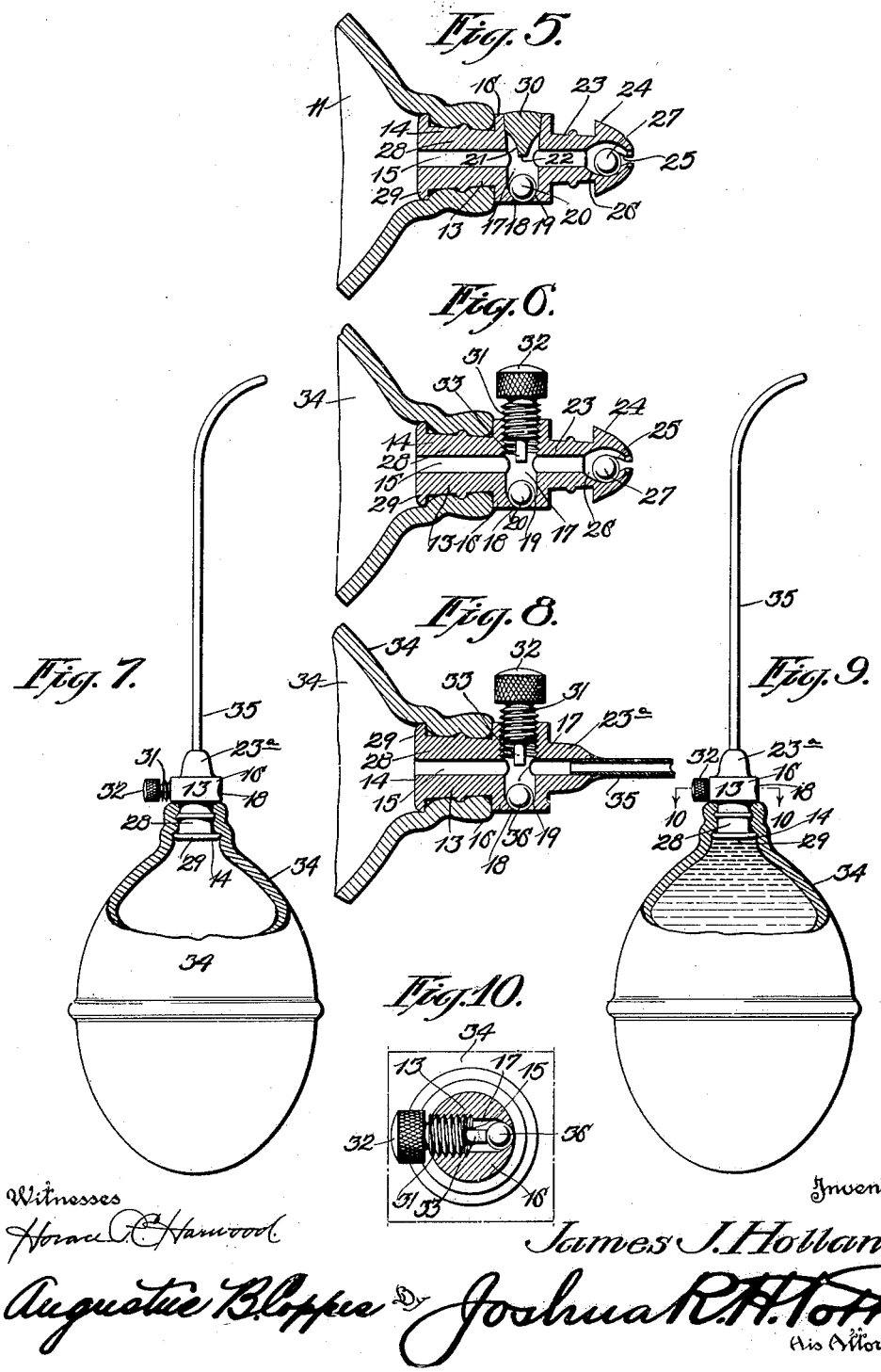

UNITED STATES PATENT OFFICE.

JAMES J. HOLLAND, OF PHILADELPHIA, PENNSYLVANIA.

VALVULAR COUPLING.

1,373,505. Specification of Letters Patent. Patented Apr. 5, 1921.

Application filed May 7, 1919. Serial No. 295,316.

*To all whom it may concern:*

Be it known that I, JAMES J. HOLLAND, a citizen of the United States, residing at Philadelphia, in the county of Philadelphia and State of Pennsylvania, have invented certain new and useful Improvements in Valvular Couplings, of which the following is a specification.

One object of my invention is to provide an improved valvular coupling which is well adapted for use in connection with atomizers, sprayers, syringes, chip blowers or other purposes when pressure bulbs and flexible tubes are connected for blowing or spraying purposes.

Another object is to provide a coupling which will consist of an integral or unitary structure and include two valves, one of which will open and the other close when pressure fluid is passed through the coupling, said valves also being operative to respectively close and open when a suction or vacuum is established within the coupling.

A further object is to make my improved coupling in such manner that it can be easily regulated to vary the action and control of one of the valves or can be regulated to entirely close said latter mentioned valve when so desired.

A still further object is to make my improved coupling of a simple and durable construction and so that it will be small and take up little room when used in connection with atomizers, sprayers, blowers or other like instruments.

These objects, and other advantageous ends which will be described hereinafter, I attain in the following manner, reference being had to the accompanying drawings in which—

Figure 1 is a side elevation illustrating my improved valvular coupling used to connect an air-pressure rubber bulb to a rubber tube of a well known form of atomizer or sprayer, Fig. 2 is an enlarged central longitudinal section of my improved valvular coupling showing the same connected to a bulb and tube, such as the bulb and the tube shown and referred to in connection with Fig. 1, Fig. 3 is a view of the structure shown in Fig. 2 with the valves in another operative position, Fig. 4 is a section taken on the line 4—4 of Fig. 3, Fig. 5 is a view of similar nature to that shown in Figs. 2 and 3 illustrating a slight modification thereof, Fig. 6 is a view of similar character to Fig. 5 showing another modification of certain of the parts thereof, Fig. 7 is an elevation of another form of my invention shown as a part of a device used particularly by dentists for blowing chips out of the teeth during the drilling operation, a part of the bulb being broken away and shown in section so as to more clearly illustrate my invention, Fig. 8 is an enlarged fragmentary section of my invention illustrating the same when used for the device illustrated in Fig. 7, Fig. 9 is a view similar to that shown in Fig. 7 with the exception that the parts are so arranged that the valve will be inoperative so that when the bulb is pressed the valve will have no effect and the bulb can be used as a receptacle for liquid and can be filled due to suction produced when the bulb is compressed and allowed to expand thereby rendering it serviceable as a syringe, and Fig. 10 is a section taken on the line 10—10 of Fig. 9.

Referring to Figs. 1 to 4 inclusive of the drawings, 11 represents a rubber bulb which serves as a pump and is operative when compressed to blow air through a rubber tube 12. My improved coupling 13 serves to connect the bulb 11 to the tube 12 and also serves to prevent the air which is forced through the tube 12 from returning into the bulb 11 when the bulb is released and permitted to expand. Furthermore, the coupling is adapted to admit air from the atmosphere into the bulb 11 so as to permit the bulb to quickly expand to its normal position and fill with air.

My improved coupling has a body portion or valve casing 14 preferably made of metal either cast or turned and has a longitudinal passage 15 extending entirely therethrough from end to end. The body portion 14 has an annular rib or boss 16 located between its ends and a transverse passage 17 extends entirely through the boss 16 and intersects the longitudinal passage 15 so that said transverse and longitudinal passages are in communication with each each other, as clearly shown in Fig. 2. The transverse passage 15 is reduced in diameter at one end as illustrated at 18 and a valve seat 19 is formed adjacent the portion 18. The transverse passage 17 at portions other than the port 18 is of greater diameter than the portion of the longitudinal passage 17 which it intersects, and a ball valve 20 is positioned within said transverse passage and adapted under certain conditions to engage the seat 19 and thereby cut off the transverse passage to the atmosphere. The opposite end of the transverse passage 17 is normally closed by a stop plug 20ª which as illustrated in Figs. 1 to 4 inclusive is in the form of a screw having its inner end portion 21 tapered so that the extreme inner end 22 is smaller in diameter than either of the passages 15 and 17 at their points of intersection. The ball valve 20 is of less diameter than the diameter of the transverse passage 17 adjacent the intersection of said transverse passage with the longitudinal passage 15 so that said ball valve 20, even though it is in engagement with the end 22 of the stop plug 20ª will not cut off communication between the transverse and longitudinal passage. This position of the ball valve 20 occurs under certain conditions, such for example as shown in Fig. 3. The body portion 14 of the coupling includes a stem 23 through which the longitudinal passage 17 extends, said stem 23 having a head 24 thereon which is provided with lateral ports 25. The portion of the longitudinal passage 15 within the stem 23 is made curved in transverse and longitudinal section and is of greater diameter than the portion of said longitudinal passage which is intersected by the transverse passage. This arrangement provides a seat 26 for a ball valve 27 so that when suction or vacuum is created in the passage 15, the ball valve 27 will be automatically drawn into engagement with the seat 26 and prevent vacuum from being produced in the tube 12. The head 24 serves to retain the tube 12 upon the stem 23, and the side surface of the annular boss 16 adjacent the head 24 forms an abutment for the end of the tube 12. The body portion 14 at a position on the other side of the boss 16 includes a stem 28 having a head 29 for attachment to the bulb 11, and the adjacent side surface of the boss 16 forms an abutment for the end of the bulb; this construction being clearly shown in Figs. 2 and 3.

In operation, considering that the bulb 11 is filled with air, when the bulb is compressed, for example by squeezing the same in the hand, the air within the bulb will be forced through the longitudinal passage 15 and this action will cause the ball valve 20 to be moved into engagement with the seat 19, thereby preventing the air from being discharged into the atmosphere, and the ball valve 27 will be pushed from its seat 26 so that the air will pass into the tube 12 through the lateral ports 25. When the bulb 11 is released a suction will be established in the longitudinal passage 15 and thereby draw the ball valve 27 into engagement with the seat 26 so as to cut off communication between the tube 12 and bulb 11, and the ball valve 20 will be drawn from its seat 19 so as to permit air to quickly enter the bulb 11 from the atmosphere through the transverse passage 17 and longitudinal passage 15. The inner end of the stop plug 20ª is positioned, as shown in Figs. 2 and 3, so that the compression of the bulb will cause the air to quickly pull or move the ball valve 20 into engagement with its seat 19. In this manner practically all of the air within the bulb 11 can be forced into the tube 12. Fig. 2 shows the positions of the ball valves when air is being forced through the longitudinal passage 15 by the compressing action of the bulb 11. Fig. 3 shows the action when the bulb is released and the air is entering the bulb through the transverse passage 17. It will be noted that by screwing the stop plug 20ª inwardly or downwardly, the action of the ball valve 20 will vary since the space through which said latter ball valve must pass is either reduced or increased in length. In this manner, I can adjust the valve structure to suit various conditions, or if desired the stop plug 20ª can be screwed inwardly to such extent as to permanently hold the ball valve 20 in engagement with the seat 19 for purposes which will be described hereinafter in connection with another form of my invention.

In the construction shown in Fig. 5, instead of providing a screw threaded stop plug, I provide a stop plug 30 which can be driven in the transverse passage 17 and in this instance the transverse passage is not screw threaded. In all other respects the construction of Fig. 5 is similar to that described in Figs. 1 to 4 inclusive and I have therefore given similar parts corresponding reference numerals.

In Fig. 6, I have illustrated a stop plug 31 provided with a knurled head 32 and instead of showing the inner end portion tapered as above described, I have shown the same in the form of a pin or projection 33 of comparatively small diameter and adapted to form a stop for a ball valve, such as the ball valve 20 above described. In all other respects the construction of Fig. 6 is similar to that described in connection with Figs. 1 to 4 inclusive and I have therefore given similar parts corresponding reference numerals.

In the form of my invention shown in Figs. 7 to 10 inclusive, I have illustrated my invention with the valve 27, ports 25 and head 24 eliminated and have coupled the head 29 and stem 28 to a bulb 34 and secured a tube, such for example as a metallic tube 35, to the stem 23ᵃ in alinement with the passage 15. In this construction when the stop plug is in the position illustrated in Figs. 7 and 8, the ball valve 36 will close when the bulb 34 is compressed and will open when the bulb 34 is permitted to expand. When the parts are in the position shown in Figs. 7 and 8, the entire device can be used for blowing air through the tube 35 and the bulb 34 will quickly fill with air when the bulb is released. Thus, it is not necessary to wait for the filling of the bulb through the tube 35, which is made of comparatively small diameter. In all other respects the construction is the same as described in connection with Fig. 6 and I have therefore given similar parts corresponding reference numerals.

In Figs. 9 and 10, the stop plug is screwed inwardly so that the end 33 holds the ball valve 36 in engagement with its seat and in this position the valve is inoperative and the air or other fluid will be forced through the tube 35 and the bulb can again be filled with air or other fluid by sucking the same in through the tube 35. When the parts are in this position, the device as illustrated can be used by a dentist or the like for washing out the cavity of a tooth and the bulb can be filled by permitting it to expand, while the outer end of the tube 35 is inserted into a receptacle containing water or other liquid. Therefore, in the form of my invention shown in Figs. 7 to 10 inclusive in order to change the device as illustrated from a chip blower to a liquid syringe it is merely necessary to turn the screwed stop plug 31 inwardly and vice versa, when it is desired to change a device from use as a liquid syringe to a chip blower it is merely necessary to turn the screwed stop plug 31 from the position shown in Fig. 10 to the position shown in Fig. 8.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A valvular coupling of the character described including a casing having a longitudinally extending passage and a transversely extending passage communicating with said first passage; a stop plug in said transverse passage located at one side of the longitudinal passage, said transverse passage having a valve seat located at the side of said longitudinal passage opposite said plug; a valve located to move freely between the inner end of said plug and said valve seat, the portion of said valve casing including one end of said longitudinal passage being shaped to provide a coupling to which an air pumping bulb may be attached, said longitudinal passage at the opposite side of said transverse passage having a valve seat located inwardly from its end; and a valve interposed between said latter valve seat and said latter end of the longitudinal passage so that when air is forced through said first end of the longitudinal passage and outwardly through the opposite end thereof, said first valve, due to the pressure of said air, will be moved into engagement with its seat, and when suction is established in said first end of the longitudinal passage, said first valve will be opened thereby and permit air to enter said first end of the longitudinal passage through said transverse passage; substantially as described.

2. A valvular coupling of the character described including a casing having a longitudinally extending passage and a transversely extending passage communicating with said first passage; a stop plug in said transverse passage located at one side of the longitudinal passage, said transverse passage having a valve seat located at the side of said longitudinal passage opposite said plug; a valve located to move freely between the inner end of said plug and said valve seat, the portion of said valve casing including one end of said longitudinal passage being shaped to provide a coupling to which an air pumping bulb may be attached, said longitudinal passage at the opposite side of said transverse passage having a valve seat located inwardly from its end; and a valve interposed between said latter valve seat and said latter end of the longitudinal passage so that when air is forced through said first end of the longitudinal passage and outwardly through the opposite end thereof, said first valve, due to the pressure of said air, will be moved into engagement with its seat, and when suction is established in said first end of the longitudinal passage, said first valve will be opened thereby and permit air to enter said end of the longitudinal passage through said transverse passage, said plug being adjustable inwardly and outwardly of said transverse passage and having its inner end tapered so as not to restrict the passage of air directly through said longitudinal passage; substantially as described.

3. A valvular coupling of the character described including a casing having a longitudinally extending passage and a transversely extending passage communicating with said first passage; a stop plug in said transverse passage located at one side of the longitudinal passage, said transverse passage having a valve seat located at the side of said longitudinal passage opposite said plug; a valve located to move freely between the inner end of said plug and said valve seat, the portion of said valve casing including one end of said longitudinal passage being shaped to provide a coupling to which an air pumping bulb may be attached; said longitudinal passage at the opposite side of said transverse passage having a valve set located inwardly from its end; and a ball valve interposed between said latter valve seat and said latter end of the longitudinal passage; substantially as described.

4. A valvular coupling of the character described including a longitudinal passage extending entirely therethrough, said coupling having a transverse passage extending entirely therethrough and intersecting said longitudinal passage, said transverse passage having a valve seat adjacent one end; a stop plug having a portion fitting the opposite end of said transverse passage and having an inner end portion of reduced diameter; and a valve interposed between said end portion and said valve seat, said longitudinal passage having a valve seat therein and lateral ports, said latter passage at its portion adjacent said seat having a valve therein adapted to engage said seat and thereby cut off communication between said ports and the portion of said longitudinal passage adjacent said transverse passage; substantially as described.

5. A valvular coupling of the character described including a longitudinal passage extending entirely therethrough, said coupling having a transverse passage extending entirely therethrough and intersecting said longitudinal passage, said transverse passage having a valve seat adjacent one end; a stop plug having a portion fitting the opposite end of said transverse passage and having an inner end portion of reduced diameter; and a valve interposed between said end portion and said valve seat, said longitudinal passage having a valve seat therein and lateral ports, said latter passage at its portion adjacent said seat having a ball valve therein adapted to engage said seat and thereby cut off communication between said ports and the portion of said longitudinal passage adjacent said transverse passage, the part of said longitudinal passage having the ball therein being curved in longitudinal and transverse section, the part of said latter portion of the longitudinal passage remote from said valve seat being of less diameter than said ball valve whereby the ball is retained in said latter mentioned portion of the longitudinal passage; substantially as described.

6. A valvular coupling of the character described including a casing having a longitudinally extending passage and a transversely extending passage communicating with said first passage, there being a tapered stop extending in the direction of said transverse passage, said transverse passage having a valve seat located between said longitudinal passage and the end of said transverse passage opposed to said tapered stop; a ball valve in said transverse passage adapted to move between said valve seat and said stop, said longitudinal passage having a valve seat located between said transverse passage and one of its ends; and a valve adapted to engage said latter valve seat, the portion of said coupling providing said end of the longitudinal passage providing a space into which said latter valve can move off its seat, said latter portion having an opening leading out of said space to permit the escape of air when said latter valve is forced off its seat; substantially as described.

In testimony whereof I have signed my name to this specification in the presence of two subscribing witnesses.

JAMES J. HOLLAND.

Witnesses.
EVELYN COMPTON,
CHAS. E. POTTS.